(12) United States Patent
Ikegawa

(10) Patent No.: US 8,749,850 B2
(45) Date of Patent: Jun. 10, 2014

(54) IMAGE READING APPARATUS AND METHOD OF CONTROLLING THE APPARATUS

(75) Inventor: Yoshiharu Ikegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 13/188,339

(22) Filed: Jul. 21, 2011

(65) Prior Publication Data

US 2012/0044515 A1 Feb. 23, 2012

(30) Foreign Application Priority Data

Aug. 17, 2010 (JP) ................. 2010-182591

(51) Int. Cl.
*G06F 3/12* (2006.01)
*H04N 1/00* (2006.01)
*H04N 1/46* (2006.01)

(52) U.S. Cl.
USPC ........ 358/3.26; 358/1.13; 358/1.14; 358/1.18

(58) Field of Classification Search
USPC ............................................... 358/1.1–1.18
See application file for complete search history.

(56) References Cited

U.S. PATENT DOCUMENTS

| | | | | |
|---|---|---|---|---|
| 6,750,990 B1 * | 6/2004 | Ohashi | ........................ | 358/496 |
| 7,782,503 B2 * | 8/2010 | Ishido et al. | .................. | 358/498 |
| 2005/0206968 A1 | 9/2005 | Sodeura et al. | ............... | 358/474 |
| 2007/0159549 A1 * | 7/2007 | Matsumoto | .............. | 348/333.11 |
| 2007/0263920 A1 | 11/2007 | Fujii et al. | ..................... | 382/141 |
| 2007/0291324 A1 | 12/2007 | Kamei et al. | .................. | 358/474 |
| 2010/0157386 A1 | 6/2010 | Okumura | ..................... | 358/488 |

FOREIGN PATENT DOCUMENTS

| | | |
|---|---|---|
| CN | 1674623 | 9/2005 |
| CN | 1946125 | 4/2007 |
| CN | 101074915 | 11/2007 |
| CN | 101646003 | 2/2010 |
| JP | 2001-144901 | 5/2001 |

OTHER PUBLICATIONS

Chinese Office Action dated Oct. 24, 2013, in counterpart Chinese Patent Application No. 201110232405.4, and English language translation.

* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

In an image reading apparatus, based on image data obtained by reading a white image, detection is performed of an abnormal pixel based on a foreign substance adhering to a reading position of an original and data indicating a position of the abnormal pixel is outputted, then image data obtained by reading an original is corrected based on that data, and detection of the abnormal pixel is carried out immediately prior to reading of a first original, and a correction process based on data indicating a position of the abnormal pixel is carried out on image data obtained by reading a second original following on from the first original.

5 Claims, 9 Drawing Sheets

F I G. 7A
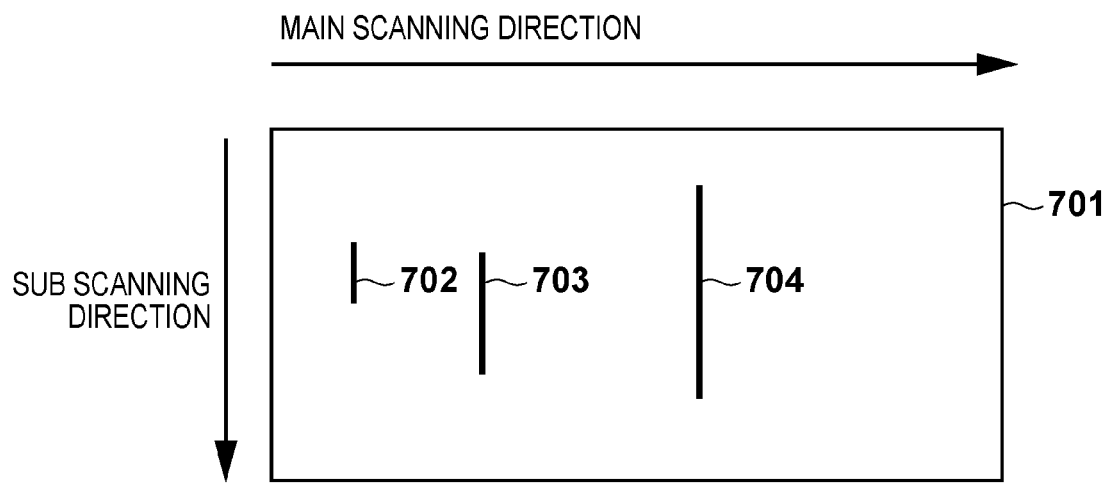
F I G. 7B
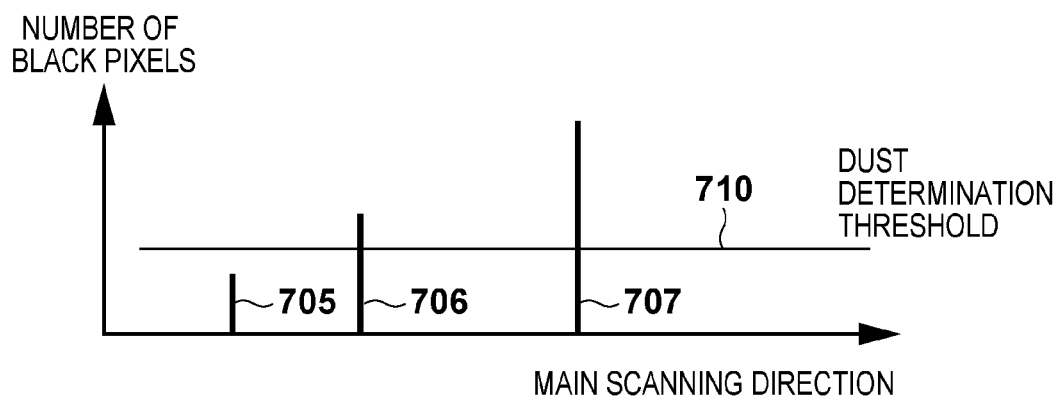

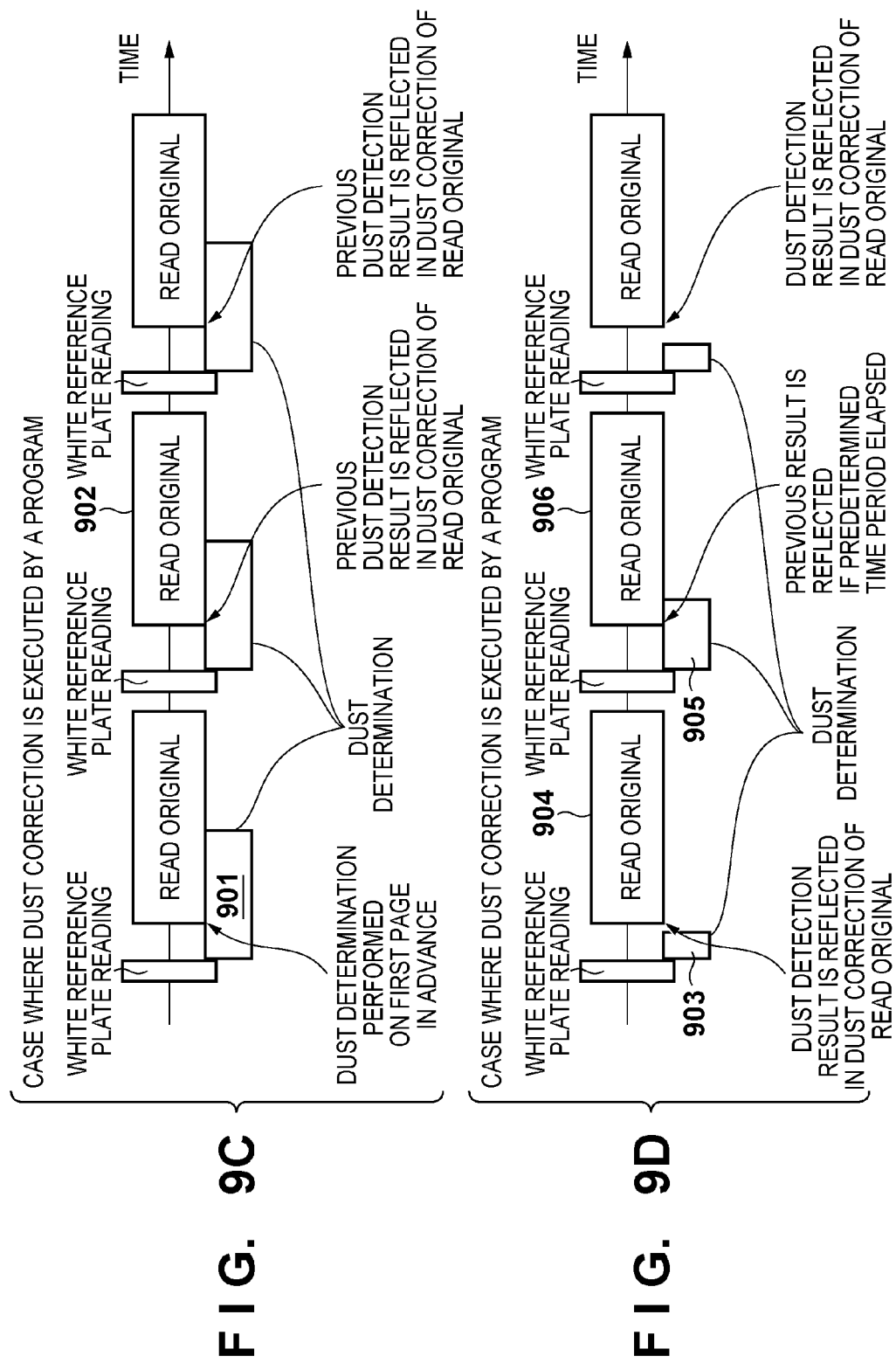

IMAGE READING APPARATUS AND METHOD OF CONTROLLING THE APPARATUS

BACKGROUND OF THE INVENTION

1. Field of the Invention

The present invention relates to image reading apparatuses and methods of controlling the apparatuses.

2. Description of the Related Art

Image reading apparatuses are known that are equipped with automatic document feeders (ADFs). Some of these image reading apparatuses are provided with a flowing document reading mode in which originals that are fed from the ADF are read while being conveyed at a fixed velocity in a state where a scanning unit that irradiates light onto the originals is secured. Since it is sufficient for the originals to be fed in one direction at a fixed velocity, this flowing document reading mode has an advantage compared to a case where originals are read with the originals being in a fixed state while the scanning unit moves in that the intervals between reading times of the originals can be shortened.

When a foreign substance such as dust or dirt adheres to the reading position of originals in a case of this flowing document reading mode, the foreign substance is detected as all black pixels in the reading scan. There is a problem with these black pixels in that they appear as black streaks in the sub scanning direction (a feeding direction of the original) of the image that has been read, and they conspicuously reduce the quality of the image that has been obtained by reading the documents.

As a method of addressing this generation of black streaks, Japanese Patent Laid-Open No. 2001-144901 describes an image reading apparatus that is provided with a means for detecting the generation of black streaks whose generation originates in dust or dirt on the platen glass, and that executes dust detection on the image data obtained by the reading. In a case where it is determined that dust or dirt is adhering, the image reading apparatus uses multiple adjacent pixel data to correct the pixel data corresponding to the portion of image data obtained by reading in which dust or dirt was detected.

When the aforementioned dust detection is carried out using a line memory, hardware circuitry such as a line memory is necessary. To eliminate the addition of such circuitry, it is also possible to execute the dust detection on the main memory and the CPU without using a line memory. However, in that case the load on the CPU is increased such that the processing speed of the CPU decreases, and therefore there is a problem of being unable to support high-speed original reading operations.

SUMMARY OF THE INVENTION

An aspect of the present invention is to eliminate the above-mentioned problems with the conventional technology.

A feature of the invention of the present application is to provide an image reading apparatus and a method of controlling thereof that, in an apparatus that reads an image of an original while conveying that original, suppresses occurrences of abnormal pixels originating in foreign substances adhering to a reading position of the original.

According to an aspect of the present invention, there is provided an image reading apparatus, comprising: a reading unit that reads an image of an original while conveying the original, a detection unit that, based on image data obtained by reading a white image with the reading unit, detects an abnormal pixel based on a foreign substance adhering to a reading position of the original and outputs data indicating a position of the abnormal pixel, a correction unit that, based on the data outputted from the detection unit, corrects image data obtained by reading an original with the reading unit, and a control unit that performs control so that detection of the abnormal pixel by the detection unit is carried out immediately prior to reading of a first original, and a correction process by the correction unit based on the data indicating a position of the abnormal pixel is carried out on image data obtained by reading a second original following on from the first original.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7A and FIG. 7B are diagrams for describing an example of dust determination according to the first embodiment.

FIG. 9C is a schematic diagram for describing the first embodiment.

FIG. 9D is a schematic diagram for describing the second embodiment.

DESCRIPTION OF THE EMBODIMENTS

Embodiments of the present invention will now be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention.

Figure 1:
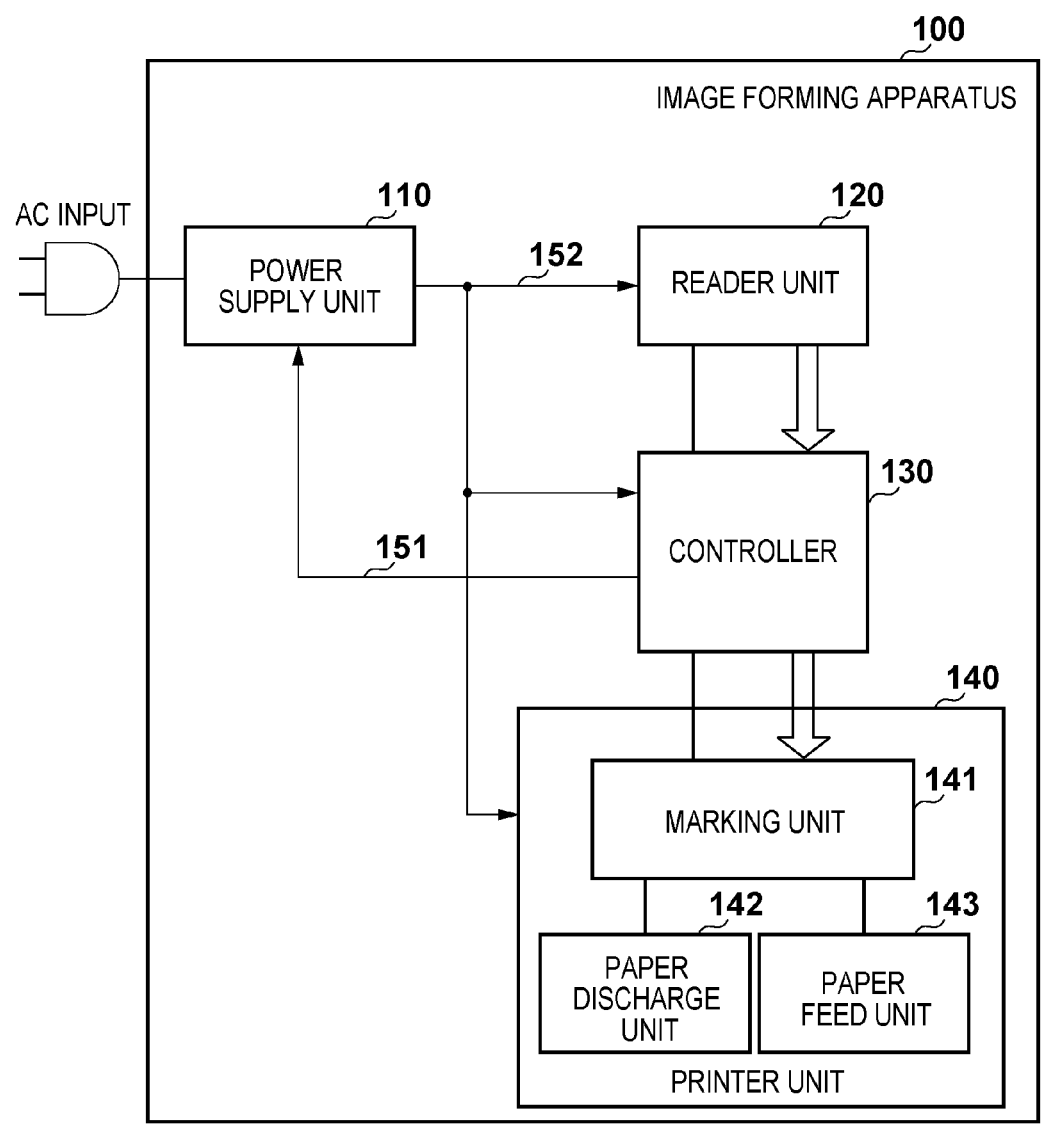
FIG. 1 is a block diagram showing a configuration of an image forming apparatus including an image reading apparatus according to a first embodiment.

FIG. 1 is a block diagram showing an overall configuration of an image forming apparatus 100 including an image reading apparatus according to a first embodiment of the present invention.

A reader unit (image input unit) 120 optically reads an original and outputs image data corresponding to an image of that original. The reader unit 120 is equipped with a scanner unit having a function for reading originals and a document feed unit having a function for conveying originals. A printer unit (image output unit) 140 conveys a recording paper (sheet) and prints the image data on that sheet as a visible image, then discharges the sheet to outside the apparatus. The printer unit 140 is provided with a paper feed unit 143 having cassettes of multiple types of recording paper, and a marking unit 141 having a printing function by which the image data is transferred to the recording paper and fixed. Further still, the printer unit 140 is provided with a paper discharge unit 142 that for example sorts and staples the printed recording papers for output to outside the apparatus.

A controller 130 is electrically connected to the reader unit 120 and the printer unit 140, and provides a copying function by which image data of the original is obtained by controlling the reader unit 120 and, based on that image data, the printer unit 140 is controlled to print the image data on a sheet. Furthermore, the controller 130 provides a scanner function by which the image data outputted from the reader unit 120 is converted to code data, and then transmitted to a server or the like via a network. Furthermore, it provides a printer function by which code data received from a PC via the network is converted to image data and printed by the printer unit 140.

A power supply unit 110 provides a DC voltage or an AC voltage to the controller 130, the reader unit 120, and the printer unit 140 via a power supply line 152 using a power supply circuit that inputs a commercial-use AC power supply (AC power supply). Furthermore, the DC voltage generated by the power supply unit 110 is controlled according to a control signal 151 from the controller 130.

Figure 2:
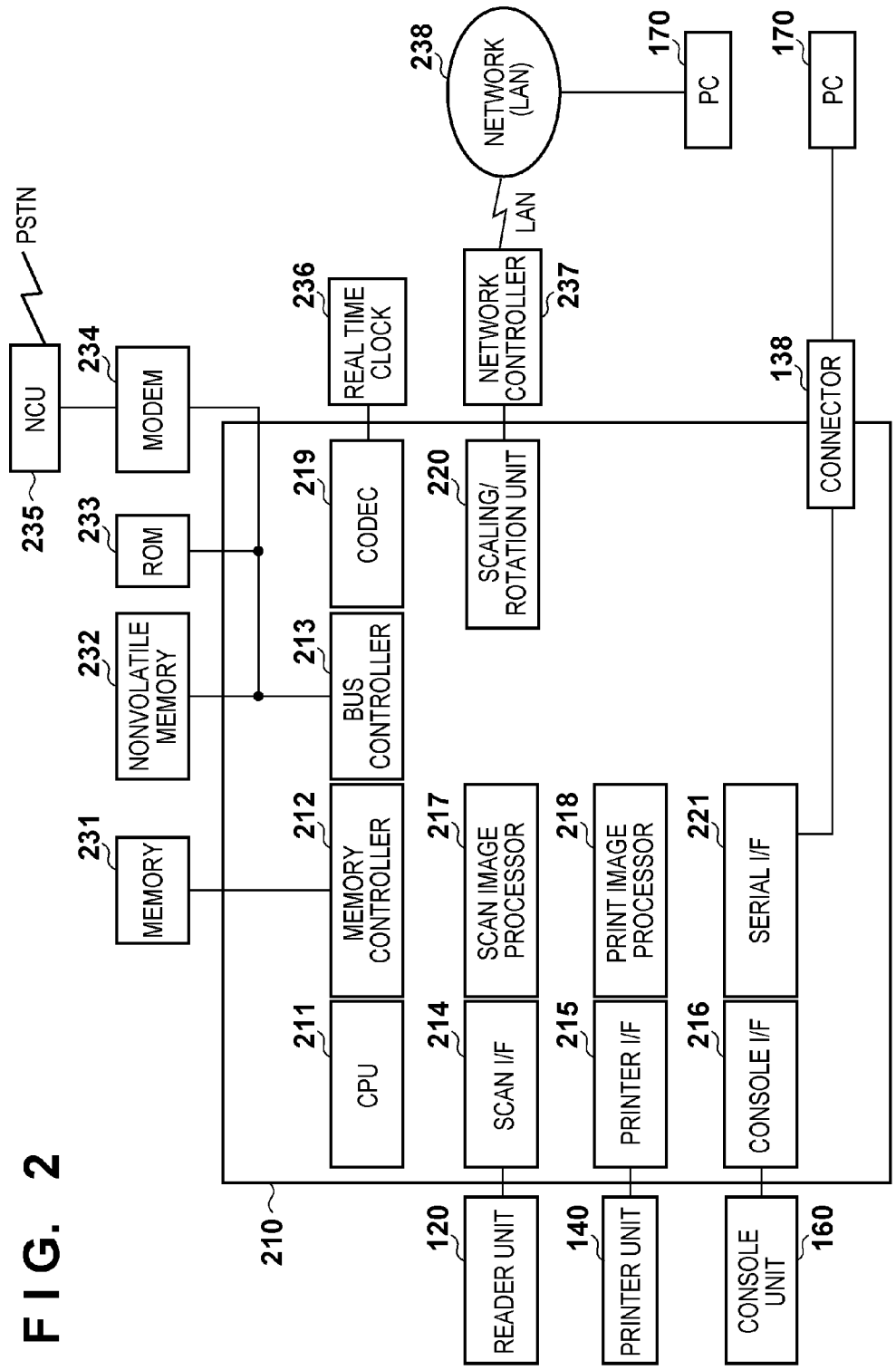
FIG. 2 is a block diagram for describing a configuration of a controller of the image forming apparatus.

FIG. 2 is a block diagram for describing a configuration of the controller 130.

A main controller 210 is provided with a CPU 211, a memory controller 212, a bus controller 213, a scan I/F 214, a printer I/F 215, and a console I/F 216. Further still, the main controller 210 is equipped with a scan image processor 217, a print image processor 218, a codec 219, a scaling/rotation unit 220, and a serial I/F 221. The CPU 211 and the memory controller 212 control the overall operations of the controller 130, and the CPU 211 operates according to a program stored in a memory 231. Furthermore, an operation by which PDL (page description language) data received from a host computer (PC) 170 is interpreted and expanded into raster image data is described in this program, and the CPU 211 performs the processing for the interpretation of the PDL data and its expansion into raster image data. The memory controller 212 controls data transfers between each I/F and the memory 231, and carries out bus arbitration and control of DMA data transfers. The bus controller 213 controls access to a nonvolatile memory 232, a ROM 233, and a modem 234.

The scan I/F 214 receives image data inputted from the reader unit 120, and transfers image data to the memory 231 and the scan image processor 217. The scan image processor 217 executes predetermined image processing on the image data received from the scan I/F 214. Examples of the image processing that can be set forth include line pitch correction, offset correction, non-linear correction, color space matching, MTF correction, spatial filtering, and achromatic detection.

The printer I/F 215 generates control signals according to video control signals sent from the printer unit 140, and outputs the video signals along with the control signals to the printer unit 140. The print image processor 218 has a function of inputting raster image data from the memory 231 and outputting data on which halftone image processing has been executed to the memory 231. Examples of the image processing that can be set forth include color space compression, under color removal, log conversion, non-linear color space conversion, random addition, gamma conversion, error diffusion process, and screen processing.

The codec 219 compresses the raster image data that is accumulated in the memory 231 using a format such as MH, MR, MMR, JBIG, or JPEG, and conversely decompresses the thus-compressed and accumulated code data into raster image data for storage in the memory 231. The scaling/rotation unit 220 has a function by which are carried out a process of enlarging or reducing the raster image data accumulated in the memory 231, and a rotation process of rotating the image data 90°, 180°, or 270°. The nonvolatile memory 232 stores the programs of the CPU 211 and various settings data. The ROM 233 is used for saving user modes and various settings information, and a font ROM or the like may also be stored in the ROM 233.

The console I/F 216 carries out communications between itself and a console unit 160. The console unit 160 is provided with a liquid crystal display unit and multiple hardware keys. Signals inputted using these hardware keys are conveyed to the CPU 211 via the aforementioned console I/F 216, and data sent from the console I/F 216 is displayed on the liquid crystal display unit. The liquid crystal display unit is configured having a touch panel and displays operational screens of the image forming apparatus 100. The serial I/F 221 carries out communications with the host computer (PC) 170 and communications with various devices via a connector 138. USB can generally be set forth as an example of a serial bus. The serial I/F 221 is used for such purposes as an I/F for receiving PDL data from the host computer (PC) 170, for command communications with recording media on which digital image data has been recorded, and for transferring image data. The modem 234 and an NCU 235 are connected to a public network and carry out control of FAX communications. A real time clock module 236 performs timing to update/save dates and times for internal device management and is backed up by a backup battery. A network controller 237 is connected to an external network 238. A LAN can generally be set forth as an example of the network 238 and is used for purposes such as receiving PDL data from the host computer (PC) 170, sending image data received from the reader unit 120, and remote management or the like.

Figure 3:
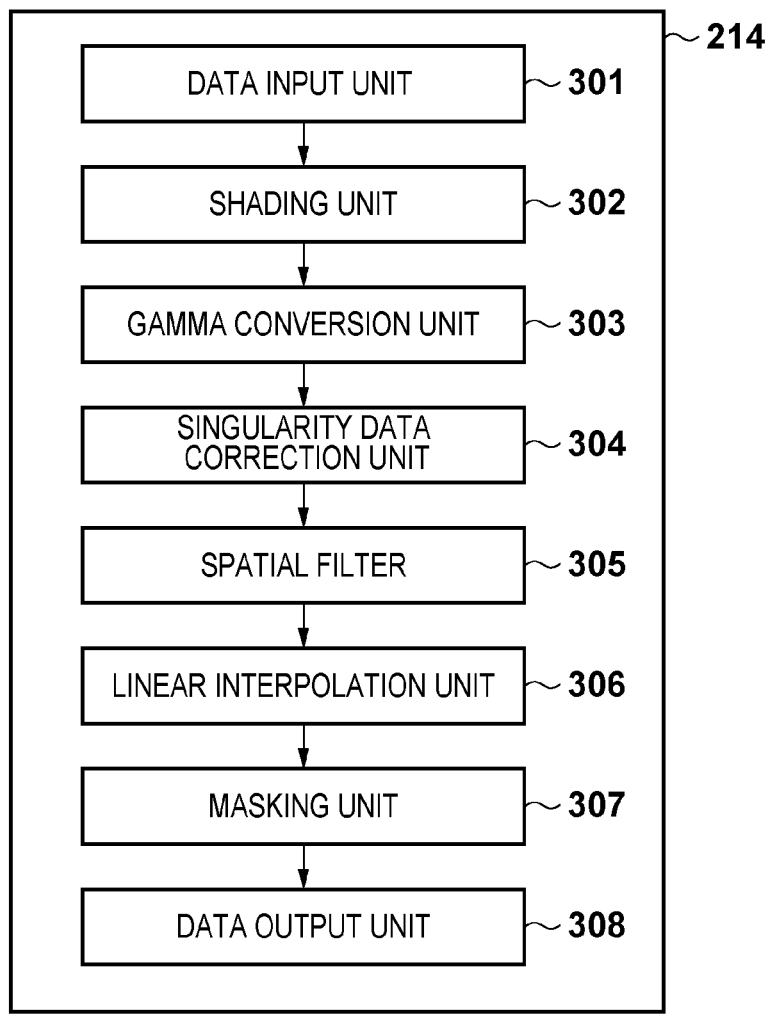
FIG. 3 is a block diagram showing a configuration of a scan I/F of the image reading apparatus.

FIG. 3 is a block diagram showing a configuration of the scan I/F 214.

A data input unit 301 converts image data that has been inputted from the reader unit 120 to image data of a format suited to subsequent processing. A shading unit 302 executes shading correction and black correction on this image data. In this manner, shading corrected digital image data undergoes one-dimensional non-linear gamma conversion for each of RGB image data sets by a gamma conversion unit 303. With respect to a specific area in which singularity data has been produced in image data in the main scanning direction, a singularity data correction unit 304 uses pixel data adjacent to the left/right of that specific area to carry out interpolation or substitution to correct the image data. The singularity data indicated here is black pixels (abnormal pixels) that occur due to dust, and indicate locations for which it has been determined in a dust determination according to the present embodiment that dust (a foreign substance) is present.

Figure 4:
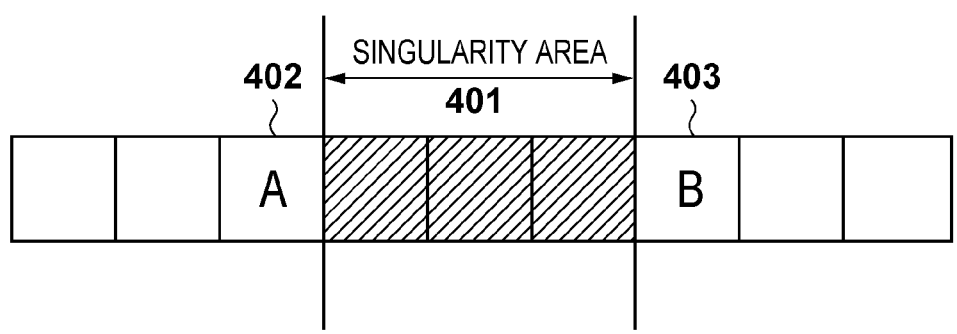
FIG. 4 is a diagram for describing a correction process of singularity data of a specific area.

FIG. 4 is a diagram for describing a correction process of singularity data of a specific area.

Pixel data within a specific area 401 is replaced using values of linear interpolation of pixel data of left/right pixels A402 and B403. In this way, pixel data of black streaks (collections of abnormal pixels) that are generated in locations where dust (a foreign substance) has been detected is corrected based on pixel data positioned to the left and right of that specific area, thereby enabling the occurrences of such black streaks to be suppressed.

A spatial filter 305 carries out matrix calculations for adjusting the sharpness of image data. Here, after an RGB→LCaCb color space conversion has been carried out, 7×1 calculations are executed on the luminance component. A linear interpolation unit 306 carries out variable scaling in a range of 50% to 200% using linear interpolation. A masking unit 307 carries out frame erasing process and trimming/masking processing. Frame erasing process involves carrying out original frame erasing, punch hole erasing, and book frame erasing and the like. A data output unit 308 outputs and stores image data that has undergone the aforementioned processing to the memory 231. Here, processed image data is stored in the memory 231 as sequential data of RGB planes.

Figure 5:
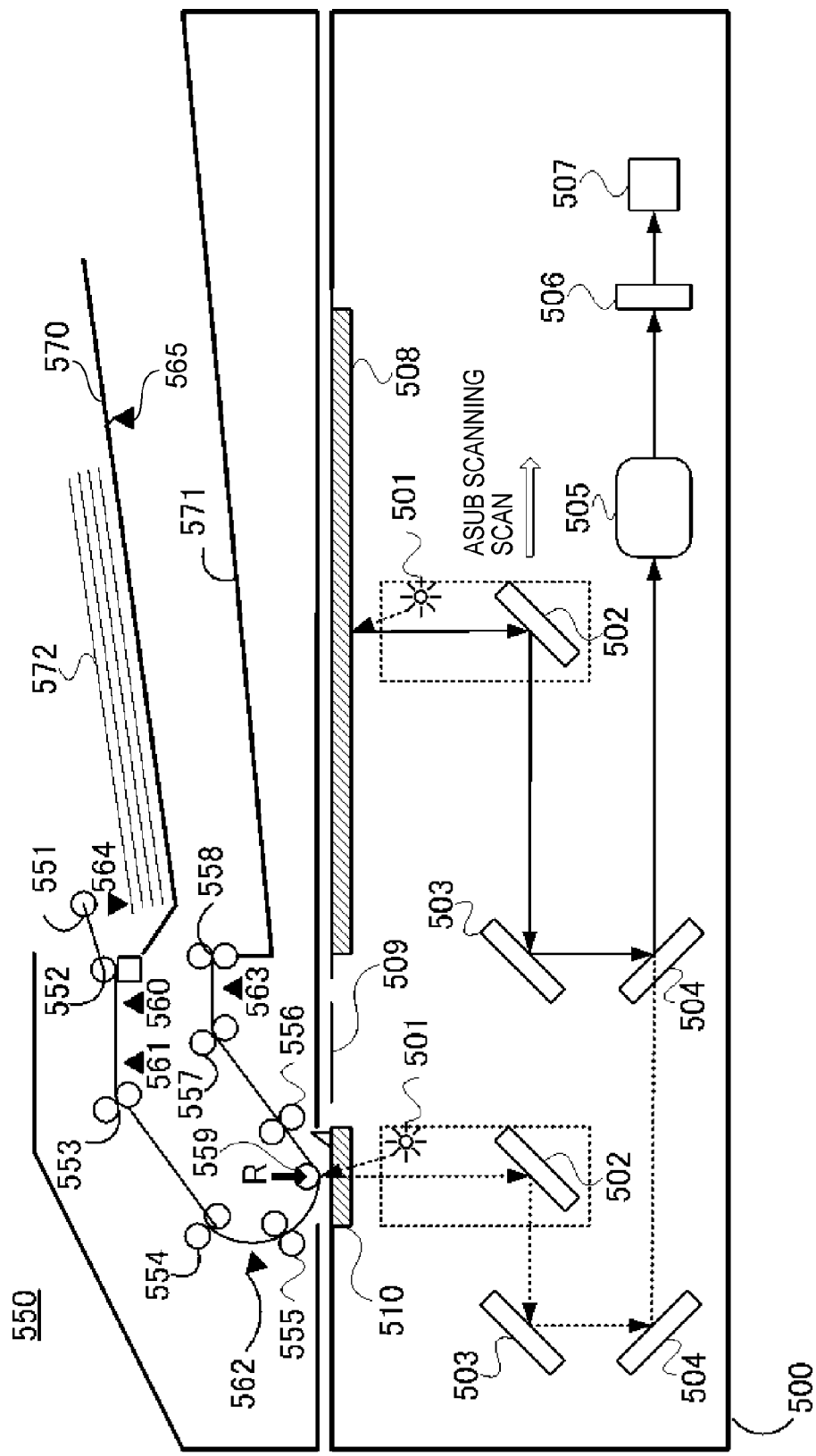
FIG. 5 is a diagram showing a configuration of a reader unit in which an ADF is installed.

FIG. 5 is a diagram showing a configuration of the reader unit 120 in which an automatic document feeder (ADF) is installed. The reader unit 120 is equipped with an image reading apparatus 500 and an ADF 550.

In the image reading apparatus 500, numeral 501 denotes an illumination lamp, numerals 502 to 504 denote first to third mirrors respectively, numeral 505 denotes a lens, numeral 506 denotes a linear images sensor, and numeral 507 denotes an A/D converter. Numeral 508 denotes a platen glass, numeral 509 denotes a white reference plate that is a reference for shading corrections, and numeral 510 denotes a flowing document reading glass. In a state in which the illumination lamp 501 and the mirrors 502 to 504 are positioned on the left side in FIG. 5, the image reading apparatus 500 performs reading using a flowing document reading method in which originals are read passing a reading position R at a fixed velocity. Furthermore, originals can be read using a method of scanning originals in which an original placed on the platen glass 508 is read while the illumination lamp 501 and the mirrors 502 to 504 move in the sub scanning direction. However, in the following embodiments, description is given of a case in which originals are read using the flowing document reading method.

Reflected light from the original that passes the reading position R is inputted to the image sensor 506 via the mirrors 502 to 504 and the lens 505, and one main scan portion of image data of the original from the image sensor 506 is outputted to be converted to digital signals by the A/D converter 507. When the entire original passes the reading position R in this manner, one sheet portion of image data of this original is obtained as digital image data.

Next, description is given regarding a roller flowing document reading method of the ADF 550.

Numeral 551 denotes a pickup roller, numeral 552 denotes a separator, numeral 553 denotes a first registration roller, numeral 554 denotes a second registration roller, numeral 555 denotes a first conveyance roller, numeral 556 denotes a second conveyance roller, numeral 557 denotes a third conveyance roller, numeral 558 denotes a discharge roller, and numeral 559 denotes a white roller whose surface is white for detecting dust on the flowing document reading glass. A separation sensor 560 detects whether or not originals are being conveyed sheet by sheet. A registration sensor 561 detects whether an original has reached a position of the first registration roller 553. A read sensor 562 detects whether an original has reached immediately prior to the first conveyance roller 555 and provides an activation timing for commencing reading of the original. A discharge sensor 563 detects whether an original has reached a position of the discharge roller 558. An original detection sensor 564 detects whether or not an original is on an original tray 570. An original length detection sensor 565 detects whether or not the length of an original of an original bundle 572 on the original tray 570 is a predetermined value or greater. Originals that have been read are stacked and accommodated on a paper discharge tray 571.

In the above-described configuration, the ADF 550 uses the pickup roller 551 to withdraw the uppermost original toward the separator 552 among the original bundle 572 that has been set with their front side facing upward on the original tray 570. The separator 552 includes a separation roller arranged above and a separation pad arranged below, and originals are separated sheet by sheet from the uppermost sheet of the original bundle 572. After undergoing skew correction that occurs during separation and transport by the first registration roller 553, the thus-separated original is transported by the first conveyance roller 555 from the first registration roller 553 to the second registration roller 554. Then, the originals are transported with their front side facing downward in order onto the paper discharge tray 571 by the third conveyance roller 557 and the discharge roller 558 from the second conveyance roller 556 via the flowing document reading position R.

Here, the pickup roller 551, the separation roller of the separator 552, and the first registration roller 553 are rotationally driven by an unshown separation motor. Furthermore, the second registration roller 554, the first conveyance roller 555, and the second conveyance roller 556 are rotationally driven by an unshown paper feed motor, and the third conveyance roller 557 and the discharge roller 558 are rotationally driven by an unshown discharge motor.

Figure 6:
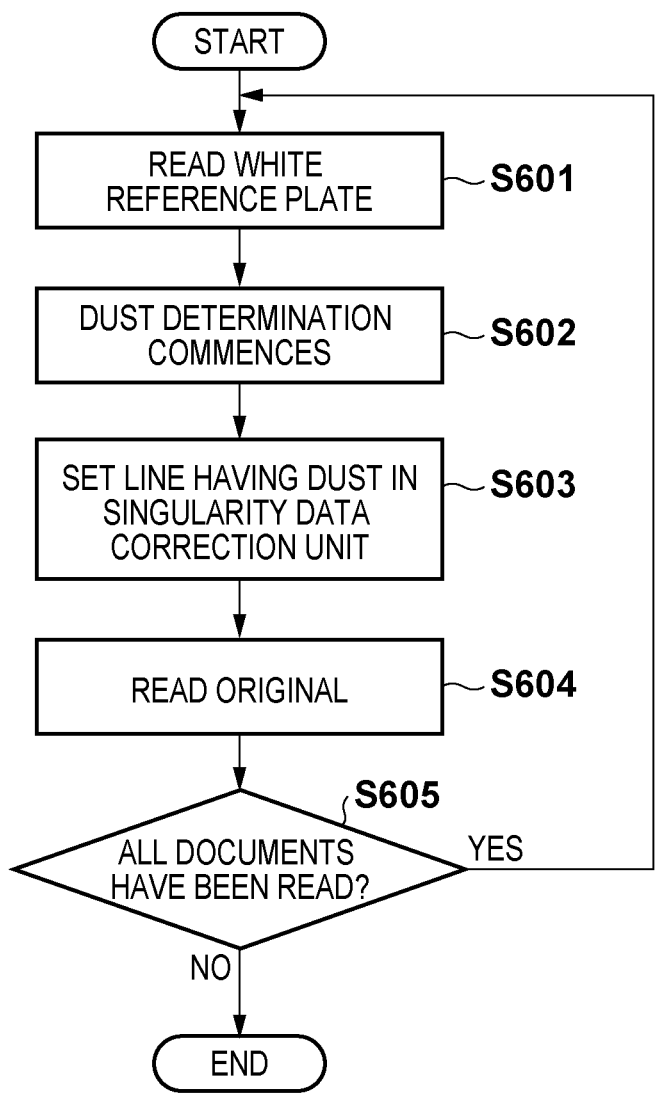
FIG. 6 is a flowchart for describing an operation of flowing document reading using the ADF according to the first embodiment.

FIG. 6 is a flowchart for describing a flowing document reading operation using the ADF 550 in the image reading apparatus according to the first embodiment. Each step shown in the flowchart of FIG. 6 is carried out according to the CPU 211 executing a program stored in the memory 231.

First, in step S601, the CPU 211 causes the reader unit 120 to read the white roller 559 of the ADF 550. At this time, the image reading apparatus 500 is in a state in which the optical system (the lamp 501 and the group of mirrors 502 to 504) is moved so that reading can be performed at a predetermined position (the reading position R) of the flowing document reading glass 510, and the optical system is secured in that position. Next, the white roller 559 is caused to rotate. Due to this, the image data obtained by reading at the reading position R is entirely white image data. Then, with respect to the white image data that has been read at the reading position R by the reader unit 120, the controller 130 stores this image data in the memory 231 without carrying out image processing (indicated by units 303 to 307) other than the processing by the shading unit 302 at the scan I/F 214. At this time, in regard to the reading size, the main scanning direction is the maximum reading size, and the sub scanning direction is a predetermined number of lines.

Next, in step S602, the CPU 211 commences the dust determination process based on the image data that has been read.

FIG. 7A and FIG. 7B are diagrams for describing an example of dust determination processing according to the first embodiment.

FIG. 7A is a diagram showing an example of a state in which black pixels (corresponding to positions where dust has adhered) are detected in the image data in the main scanning direction.

Here, the CPU 211 determines whether or not there are black pixels that have exceeded a predetermined pixel value (threshold) in a sub scanning direction line of a same main scanning position in a white image 701 that has been read, and if there are, it counts the number of those black pixels.

FIG. 7B is a diagram showing numbers of black pixels corresponding to the black pixels of FIG. 7A.

Here, the count values of black pixels corresponding to black pixel lines 702 to 704 in FIG. 7A are indicated by numerals 705, 706, and 707 respectively. Then, the CPU 211 determines whether or not the count values 705 to 707 of black pixels have exceeded a predetermined dust determination threshold 710, and in a case where the dust determination threshold 710 has been exceeded, it determines that dust is present in that line. In the example of FIG. 7B, it is determined that dust is present in the lines 703 and 704. This dust determination process is executed in parallel with the subsequent step S604, that is, the process of reading originals.

In step S603, the CPU 211 sets the lines that have been determined as a result of dust determination as having dust present in the singularity data correction unit 304. Since the dust determination process is not finished at this point in time, the previous dust determination result is set in the singularity data correction unit 304. It should be noted that in a case where there is no result of dust determination executed at a prior job or no prior job, the previous dust determination result refers to a result in which dust determination was executed at a time of powering up. That is, to prevent a reduction in original reading speeds accompanied by this dust determination processing, corrections of image data of an original for which reading is to be carried out next are carried out based on the dust determination result detected when reading a one-prior original.

Next, in step S604, the CPU 211 causes the reader unit 120 to read the original with flowing document reading using the ADF 550. Image data of one sheet of an original that has been read in this manner undergoes image processing by the scan I/F 214 and is stored in the memory 231. At this time, the CPU 211 carries out interpolation or substitution using the singularity data correction unit 304 on the pixel data of locations where it has been determined dust is present. Then, the CPU 211 uses the scan image processor 217 to execute image processing as required on the image data stored in the memory 231, and executes compression as required using the codec 219. Then, in step S605, the CPU 211 determines whether or not the reading of all originals has finished, and in case where an original remains in the ADF 550, the procedure proceeds to step S601 so that the reading of the next original is carried out by executing the procedure of the aforementioned steps S601 to S604. At this time, in step S603, the singularity data that is set at the second, third, and fourth times uses the dust determination result determined at the first, second, and third times of step S602 respectively.

Figure 9A:
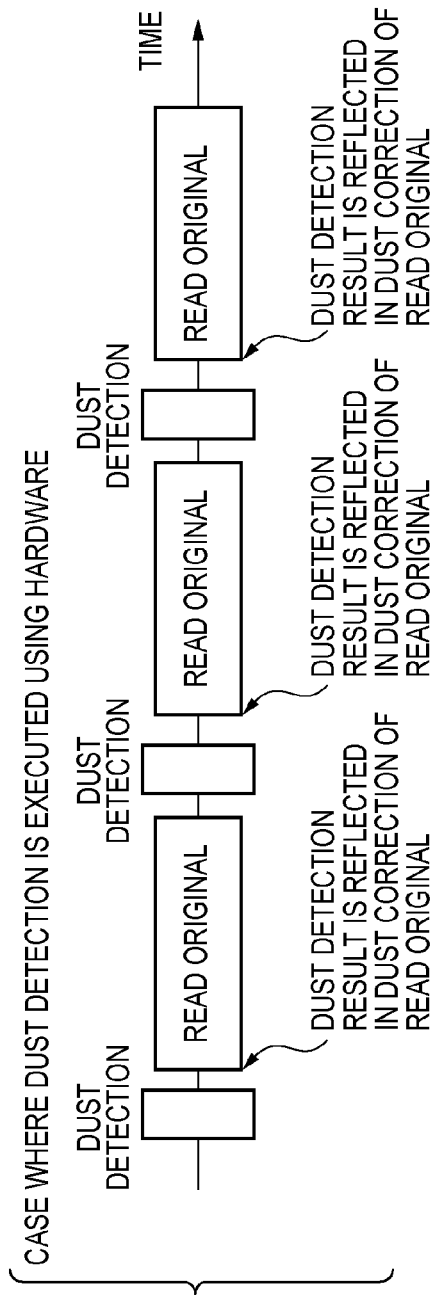
FIG. 9A and FIG. 9B are diagrams that schematically show a relationship between the dust detection process and the reading of originals with dust correction.
Figure 9B:
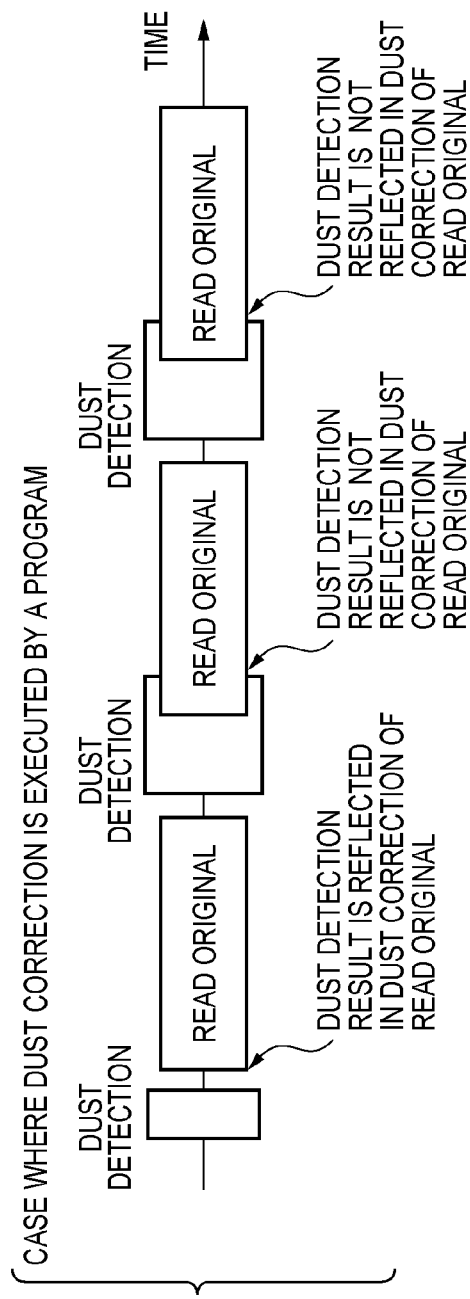

FIG. 9A and FIG. 9B are diagrams that schematically show a relationship between the dust detection process and the reading of originals with dust correction.

FIG. 9A shows a case where dust detection is executed using hardware. In this case, since the processing speed is fast and the load on the CPU is small, the white reference plate is read between the reading of an original and the reading of the next original, and the signals that are read are inputted to a dedicated hardware circuit to carry out dust detection, which is reflected in dust corrections. However, in this case, the dedicated hardware circuit is necessary, which leads undesirably to increased costs of the apparatus.

FIG. 9B shows a case where dust detection is executed using a program (software). In this case, since time is required for dust detection, sometimes the dust detection process cannot be completed before the commencement of reading the next original. In this case, dust correction processing cannot be executed properly based on a dust detection result.

FIG. 9C is a diagram for describing the first embodiment of the present invention, in which a dust detection result is used in the correction of the image of a next original to reflect the dust detection result as much as possible in the dust correction process without using a dedicated hardware circuit. Specifically, immediately prior to reading a first original, positions of dust are determined in a dust determination process 901, and based on a determination result thereof, the image data of a second original 902 that is to be read following the first original is corrected. In this way, the image data that is read of the second original 902 is corrected based on the positions of dust (singularity data) detected at the dust determination process 901 immediately prior to the first original, which is one sheet prior to the second original 902. It should be noted that in a case where there is no result of dust determination executed at a prior job or no prior job, the image data of the first original is corrected based on a result in which dust determination was executed at a time of powering up.

According to the first embodiment, the dust detection results can be reflected as much as possible in the dust correction process of image data that has been read without using a dedicated hardware circuit and without reducing the speed of reading originals.

Next, description is given of a second embodiment according to the present invention.

In the foregoing first embodiment, description was given of an example in which a dust determination result was reflected in the correction of the reading result of the next original. However, as a second embodiment, if the dust determination process is finished in time, this may be immediately reflected in the processing of the image data of the current original as singularity data. An operational flow of the image forming apparatus 100 in this case is described using FIG. 8. It should be noted that the configurations of the image reading apparatus and the image forming apparatus according to the second embodiment are the same as the configurations of the apparatuses according to the aforementioned first embodiment, and therefore description thereof is omitted.

Figure 8:
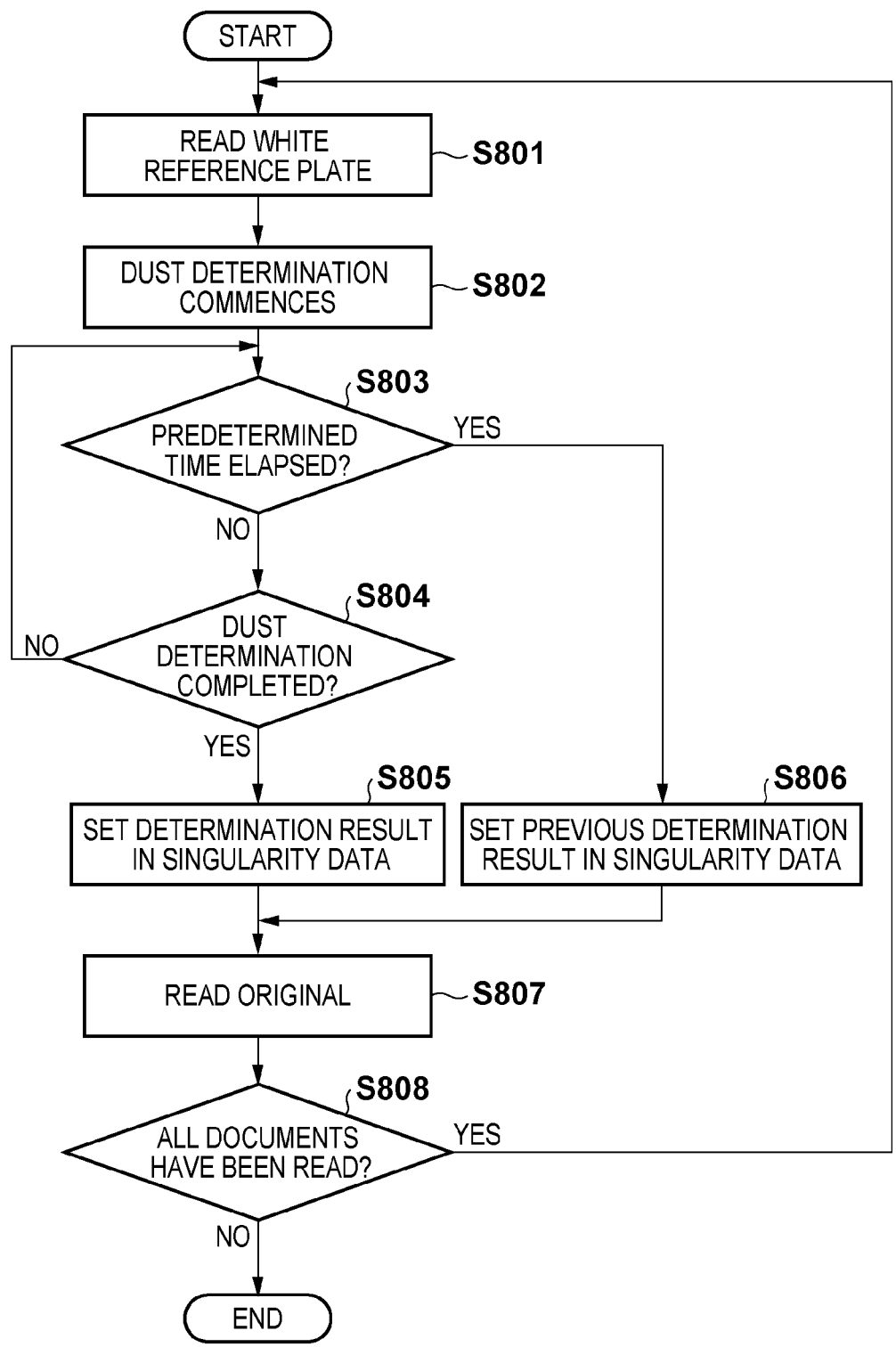
FIG. 8 is a flowchart for describing processing according to a second embodiment of the present invention.

FIG. 8 is a flowchart for describing processing by an image reading apparatus according to the second embodiment of the present invention. It should be noted that each step shown in the flowchart of FIG. 8 is achieved according to the CPU 211 executing a program stored in the memory 231.

First, in step S801, the white roller 559 of the ADF 550 is read, then the same procedure as step S601 of FIG. 6 is executed. Next, in step S802, dust determination is carried out from the white image data obtained in step S801. This also is the same procedure as step S602 of FIG. 6. Next, the procedure proceeds to step S803 and a determination is performed as to whether or not a predetermined time period that is determined in advance has elapsed according to the real time clock module 236. This predetermined time period is a maximum wait time within which the original reading speed does not drop, that is, it corresponds to a maximum time interval between originals that are conveyed successively. When the predetermined time period elapses in step S803, the procedure proceeds to step S806, and when the predetermined time period does not elapse, the procedure proceeds to step S804, and a determination is performed as to whether or not dust determination has finished. If the dust determination has finished, the procedure proceeds to S805 (first control), but if it has not finished, the procedure returns to step S803. In step S805, since the time required for dust determination processing is less than the predetermined time period, the result of the dust determination process commenced in step S802 is set in the singularity data correction unit 304 as singularity data. On the other hand, in step S806 (second control), since the time required for dust determination processing is equal to or greater than the predetermined time period and the dust determination process has not finished within the predetermined time period, the dust determination result of the previous time is set in the singularity data correction unit 304. It should be noted that in a case where there is no result of dust determination executed at a prior job or no prior job, the previous dust determination result refers to a result in which dust determination was executed at a time of powering up.

In this manner, when step S805 or step S806 is executed, the procedure proceeds to step S807, and an original from the ADF 550 is read with flowing document reading. Image data of the original that has been read in this manner undergoes image processing by the scan I/F 214 and is stored in the memory 231. The image data stored in the memory 231 in this manner undergoes image processing by the scan image processor 217 as required, and image compression is performed as required by the codec 219. Then, in step S808, a determination is performed as to whether or not the reading of all originals has finished, and in case where an original remains in the ADF 550, the procedure proceeds to step S601 so that the reading of the original is carried out in the procedure of the steps S601 to S604.

FIG. 9D is a diagram that schematically shows the required time for each process according to the second embodiment.

In FIG. 9D, a dust determination process 903 that has been carried out immediately prior to the reading of a first original 904 has finished within the predetermined time. For this reason, the image data of the first original 904 is corrected in accordance with the dust determination result of the dust determination process 903.

On the other hand, since the elapsed time of a dust determination process 905 is equal to or greater than the predetermined time and is not in time for commencement of reading of an original 906, the image data that is read for the original 906 is corrected based on the result of the dust determination process 903 prior to the reading of the one-prior original 904. This case is the same as the aforementioned first embodiment.

As described above, in the second embodiment, if the dust detection process to be carried out prior to the reading of an original is in time for the processing of image data of the original that has been read, then the image data of that original that has been read is corrected based on that dust detection result. On the other hand, if the dust detection process is not in time for the processing of the image data of the original, the dust detection result of the time when reading a one-prior original is reflected in the dust correction processing of the image data of the current original.

According to the second embodiment, in a case where the dust detection result is in time for the reading of an original, the dust detection result can be reflected immediately in the correction process of the image data of that original, and therefore more accurate dust corrections can be carried out.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-182591, filed Aug. 17, 2010, which is hereby incorporated by reference herein in its entirety.

What is claimed is:

1. An image reading apparatus, comprising:
a reading unit that reads an image of an original at a reading position while conveying the original,
a detection unit that, based on image data obtained by reading a white image at the reading position with the reading unit, detects an abnormal pixel based on a foreign substance adhering to the reading position and outputs data indicating a position of the abnormal pixel,
a correction unit that, based on the data outputted from the detection unit, corrects image data obtained by reading an original at the reading position with the reading unit,
a timer that times a time period required to detect the abnormal pixel,
a first control unit that, in a case where a plurality of originals are continuously conveyed and read with the reading unit and a time period that has been timed by the timer is less than a predetermined time period, performs control so that detection of the abnormal pixel by the detection unit is carried out prior to reading of a first original of the plurality of originals, and a correction process by the correction unit based on the data indicating the position of the abnormal pixel is carried out on image data obtained by reading the first original, and
a second control unit that, in a case where a plurality of originals are continuously conveyed and read with the reading unit and the time period that has been timed by the timer is equal to or greater than the predetermined time period, performs control so that detection of the abnormal pixel by the detection unit is carried out prior to reading of a first original of the plurality of originals, and the correction process by the correction unit based on the data indicating the position of the abnormal pixel is carried out on image data obtained by reading a second original following the first original.

2. The image reading apparatus according to claim 1, wherein the correction unit corrects pixel data corresponding to the data indicating the position of the abnormal pixel among image data obtained by reading an original with the reading unit using linear interpolation of pixel data of multiple pixels adjacent to the pixel data.

3. The image reading apparatus according to claim 1, wherein the predetermined time period is a time period corresponding to a time interval between originals being conveyed successively.

4. A method of controlling an image reading apparatus having a reading unit that reads an image of an original at a reading position while conveying the original, comprising:
detecting, based on image data obtained by reading a white image with the reading unit at the reading position, an abnormal pixel based on a foreign substance adhering to the reading position of the original and outputting data indicating a position of the abnormal pixel,
correcting, based on the data outputted in the detecting step, image data obtained by reading an original with the reading unit at the reading position,
timing a time period required to detect the abnormal pixel,
performing control, in a case that a plurality of originals are continuously conveyed and read with the reading unit and the time period that has been timed in the timing step is less than a predetermined time period, so that detection of the abnormal pixel in the detecting step is carried out prior to reading of a first original of the plurality of originals, and the correction process in the correcting step based on the data indicating the position of the abnormal pixel is carried out on image data obtained by reading a second original following the first original, and performing control, in a case where the plurality of originals are continuously conveyed and read with the reading unit and the time period that has been timed in the timing step is equal to or greater than the predetermined time period, so that detection of the abnormal pixel in the detecting step is carried out prior to reading of a first original of the plurality of originals, and the correction process in the correcting step based on the data indicating the position of the abnormal pixel is carried out on image data obtained by reading a second original following the first original.

5. A non-transitory computer-readable storage medium on which is stored a program for causing a computer to execute the method of controlling an image reading apparatus according to claim 4.

\* \* \* \* \*